(12) United States Patent
Brundage et al.

(10) Patent No.: US 7,519,577 B2
(45) Date of Patent: Apr. 14, 2009

(54) QUERY INTERMEDIATE LANGUAGE METHOD AND SYSTEM

(75) Inventors: Michael L. Brundage, Kirkland, WA (US); Chris A. Suver, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 412 days.

(21) Appl. No.: 10/601,444

(22) Filed: Jun. 23, 2003

(65) Prior Publication Data

US 2004/0267760 A1   Dec. 30, 2004

(51) Int. Cl.
*G06F 17/30* (2006.01)

(52) U.S. Cl. .............................. 707/3; 707/1; 707/100; 707/101

(58) Field of Classification Search ............ 707/2, 707/3, 4, 100, 102, 1, 200; 715/513, 514
See application file for complete search history.

(56) References Cited

U.S. PATENT DOCUMENTS

| | | | | |
|---|---|---|---|---|
| 5,836,014 | A | 11/1998 | Faiman, Jr. ................ | 395/707 |
| 6,601,058 | B2* | 7/2003 | Forster et al. ................. | 707/3 |
| 6,654,734 | B1* | 11/2003 | Mani et al. ................... | 707/2 |
| 6,725,212 | B2* | 4/2004 | Couch et al. .................. | 707/2 |
| 6,799,184 | B2* | 9/2004 | Bhatt et al. ................. | 707/102 |
| 6,901,410 | B2* | 5/2005 | Marron et al. ........... | 707/104.1 |
| 6,934,712 | B2* | 8/2005 | Kiernan et al. ............. | 707/102 |
| 6,947,945 | B1* | 9/2005 | Carey et al. ................ | 707/102 |
| 7,120,645 | B2* | 10/2006 | Manikutty et al. .......... | 707/102 |
| 7,124,144 | B2* | 10/2006 | Christianson et al. ....... | 707/102 |
| 7,146,352 | B2* | 12/2006 | Brundage et al. .............. | 707/2 |
| 7,203,678 | B1* | 4/2007 | Petropoulos et al. .......... | 707/4 |
| 2001/0037345 | A1 | 11/2001 | Kiernan et al. .............. | 707/513 |

FOREIGN PATENT DOCUMENTS

| | | |
|---|---|---|
| WO | WO 97/42572 A1 | 11/1997 |
| WO | WO 02/35395 A2 | 5/2002 |

OTHER PUBLICATIONS

J. Shanmugasundaram, K. Tufte, G. He, C. Zhang, D. Dewitt, J. Naughton; "Relational Databases for Querying XML Documents: Limitations and Opportunities". Proceedings of the Twenty-Fifth International Conference on Very Large Data Bases, pp. 302-314. Published Sep. 1999.*

(Continued)

*Primary Examiner*—Tim T. Vo
*Assistant Examiner*—Dangelino N Gortayo
(74) *Attorney, Agent, or Firm*—Woodcock Washburn LLP

(57) ABSTRACT

A computer system and method generate a semantic representation of one or more XML language inquiries across relational and non-relational data sources. A semantic intermediate language representation explicitly describes the meaning of the one or more XML language inquiries. The semantic intermediate language may be a graph structure with nodes which describe the operations of the original query. Operators assigned to the nodes in the semantic graph allow an unambiguous definition of the original XML query. The semantic intermediate language may be used to perform XML queries over single or multiple data sources. A method includes receiving at least one inquiry, defining at least one node object for every operation within the received inquiry, translating each node object using operators, and generating a semantic representation from the operators.

20 Claims, 4 Drawing Sheets

OTHER PUBLICATIONS

Gardarin, G. et al., "Integrating Hetergeneous Data Sources with XML and XQuery", *Proceedings of the 13th International Workshop on Database and Expert Systems Applications(DEXA)*, 2002, 713-718, XP010612111.

Shanmugasundaram, J. et al., "Querying XML Views of Relational Data", *Proceedings of the 27th International Conference on Very Large Data Bases*, 2001, 10 pages.

Ceri, S. et al., "ZML-GL: A Graphical Language for Querying and Reshaping XML Documents", http://www/w3.org/TandS/QL/QL98/pp/xml-gl.htm, 7 pages.

Jain, S. et al., "Translating XSLT Programs to Efficient SQL Queries", *WWW*, 2002, 616-626.

Castano, S. et al., "Global Viewing of Heterogeneous Data Sources", *IEEE Transactions on Knowledge and Data Engineering*, Mar./Apr. 2001, 13(2), 277-297.

Chen-Chuan, K. et al., "Boolean Query Mapping Across Heterogeneous Information Sources", *IEEE Transactions on Knowledge and Data Engineering*, Aug. 1996, 8(4), 515-521.

Reynaud, C. et al., "Semantic Integration of XML Heterogeneous Data Sources", *2001 International Database Engineering and Amp; Application Symposium*, Jul. 16-18, 2001, 199.

\* cited by examiner

QUERY INTERMEDIATE LANGUAGE METHOD AND SYSTEM

FIELD OF THE INVENTION

The invention relates generally to the field of software querying over data sources, and more particularly to using an intermediate language to query over one or more XML or virtual XML data sources.

BACKGROUND OF THE INVENTION

The eXtensible Markup Language (XML) is a World Wide Web Consortium (W3C) endorsed standard for document formatting that provides a generic syntax to mark up data with human-readable tags. XML does not have a fixed set of tags and elements and thus allows users to define such tags as long as they conform to the XML standard. Data may be stored in XML documents as strings of text that are surrounded by text markup. The W3C has codified XML's abstract data model in a specification called the XML information set (XML Infoset). The Infoset describes the logical structure of an XML document in terms of property-containing nodes. Although XML may easily describe the contents of a document in a well-defined format, there are other sources of data that may not so easily be described either because their structure is inconsistent with that of a standard text document or because of some other non-XML compatible characteristic. An example of such a data source may be a spreadsheet or a relational database.

Virtual XML is a concept which establishes consistency across diverse data access programming models and allows users to work with their data in the way they think about it instead of the actual storage format. The concept of querying over virtual XML data involves treating the data as if it were XML without ever really ever converting it to XML. One advantage in this concept is that the overhead of XML encoding is kept to a minimum. It is desirable if the virtual XML scenario had the advantage that it be able to utilize a query language to query over a non-XML data source as if the data source were XML. It is also desired that the mapping between the actual data and the virtual XML representation be of high fidelity.

There are numerous challenges inherent to implementing a virtual XML. One problem is efficiency. One could simply expose a data source with a virtual XML interface, such as XMLReader™, and then query over it with the existing XML query implementations such as XPathNavigator™. However, all of the work occurs in the XML query engine instead of being performed by the data source itself.

By way of example, consider the following virtual XML query over a structured query language (SQL) embodied in SQLServer:

sql: database ("Northwind"/Customer[@ID='ALKFI']/Order In this query, sql:database("Northwind") exposes the Northwind database of SQLServer as virtual XML, and then the XPath/Customer[@ID='ALKFI']/Order selects all the Order elements from one of the Customer elements. An implementation might attempt something like the following:

SQLServerMapping map=new SQLServerMapping("Northwind");

SQLServerXmlReader Data=new SQLServerXmlReader (map);

XPathNavigator nav=new XpathNavigator(data,"/Customer [@ID='ALKFI']/Order;

There are at least two flaws in this approach. First, the entire mapping is performed by the XmlReader even though only a part of it is used by the query. A second flaw is that SQLServer can vastly more efficiently select Customers by ID than XPathNavigator can. Note that the example above has XPathNavigator performing all of the work. A better solution to this challenge may be to offload as much of the query into the data source (here, a SQLServer database) as possible. However, this may involve significant query analysis and rewriting.

Another problem in implementing a virtual XML is that the XML data model does not always align well with the underlying data model and its type system. One could map all of the types of the underlying data source into XML types, but this process loses fidelity and is inefficient also. Furthermore, types in one system may have no obvious equivalent in another. For example, representing binary data such as images in XML requires a costly conversion to the XML character set (e.g., base64-encoding).

Prior attempts to query over virtual XML approached the problem by constructing two different data structures; one for the query and one for the mapping, and then traversing them in tandem to generate an efficient query directly over the original data sources, without ever materializing the virtual XML view. Although this approach initially works well, development becomes enormously difficult as the query and mapping languages increase in complexity. Concepts in the query or mapping often do not translate directly into the target data model, and composing complex queries with complex views requires an abundance of semantic analysis and rewrites.

Thus there is a need for a unifying representation to implement virtual XML for XML queries and views over XML and non-XML data sources. Methods and systems of implementing queries over complex mappings into less complex problems of composing queries and performing them over less complex mappings is desired. The present invention addresses the aforementioned needs and drawbacks and solves them with additional advantages as expressed herein.

SUMMARY OF THE INVENTION

The present invention is directed to an XML intermediate language definition, termed query intermediate language (QIL), which represents the meaning of an XML language query or view. The QIL is an abstraction of the meaning of a query or view in XML and may be used to execute a query or may be used as an input to a language translator or compiler to execute a query in a target language. The QIL may be used to query over both relational and non-relational data sources.

According to aspects of the invention the QIL is constructed by receiving an XML language inquiry, defining at least one node object for every operation within the XML language inquiry, translating each of the defined node objects using an QIL-specific operator; and then generating a query intermediate language representation of the original inquiry from the operators in the node graph.

Normally, the QIL language is used as part of a computer system which comprises a front-end compiler for XML languages wherein XML queries and views are generated, a QIL generator, and a back-end engine which may utilize the QIL semantic representation of the XML query or view to search over one or more data sources. The queried data sources may be relational data or non-relational data.

Examples of front-end XML languages are XPath, XSLT, XQuery, DML, OPath, and Annotated Schema. Examples of back-end engine types may be QIL to query language converters where the query language may be any of a multitude of data search languages such as SQL, MSIL and XQuery to name a few.

An exemplary QIL definition includes a set of well defined operators based on the XMLInfoset which may be used as node definition operators providing unambiguous and explicit instructions for expressing the meaning of XML query and view expressions. The operators desirably include tuples, literals, Boolean operators, sequence operators, arithmetic operators, string operators, value comparison operators, node comparison operators, function definition and invocation, XML navigation, XML construction, XML property accessors, type operators, language specific operators, data manipulation, special operators, and data source operators, for example.

Additional features and advantages of the invention will be made apparent from the following detailed description of illustrative embodiments that proceeds with reference to the accompanying drawings.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF ILLUSTRATIVE EMBODIMENTS

Overview

The XML intermediate language of the present invention explicitly represents the meaning or semantics of a query. The XML intermediate language is termed a query intermediate language (QIL).

The XML intermediate language QIL provides (1) a uniform representation of both the XML query and the XML view, thereby greatly simplifying the query/view composition problem and (2) treating all views as "virtual XML" greatly simplifies the system's interfaces. Instead of having one API for every possible language and data model, all the APIs can share a common data model; the operators of the XML intermediate language QIL.

QIL also addresses a well known compiler problem. Normally, with a language, compilers need to implement M front-end languages over N back-end target machines. If each pair-wise combination is implemented, M times N compiler implementations are needed to cover the required combinations. However, if the two are decoupled by introducing a common intermediate representation, then the complexity of the compiler reduces to only M plus N.

Query intermediate language provides the abstraction between XML query/view languages and target data models (real XML data in .NET, virtual XML views over SQL data or the filesystem) to accommodate such a compiler complexity reduction.

The query intermediate language may be more expressive than any of the XML query languages themselves. This allows new kinds of analysis and optimizations that would not be possible if the original languages only were used for queries and views.

Exemplary Computing Device

Figure 1:
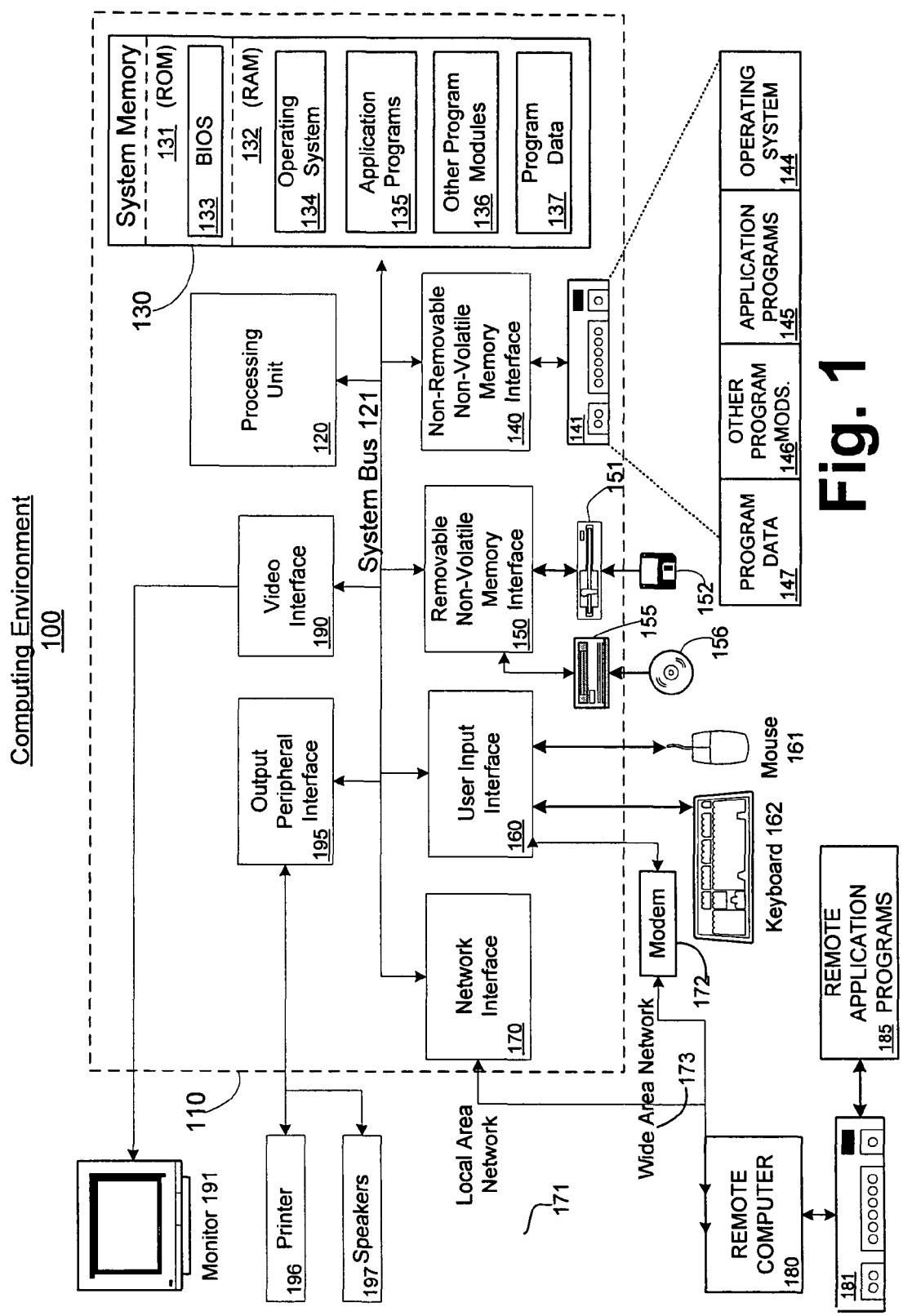
FIG. 1 is a block diagram showing an exemplary computing environment in which aspects of the invention may be implemented.

FIG. 1 and the following discussion are intended to provide a brief general description of a suitable computing environment in which the invention may be implemented. It should be understood, however, that handheld, portable and other computing devices and computing objects of all kinds are contemplated for use in connection with the present invention, as described above. Thus, while a general purpose computer is described below, this is but one example, and the present invention may be implemented with other computing devices, such as a client having network/bus interoperability and interaction. Thus, the present invention may be implemented in an environment of networked hosted services in which very little or minimal client resources are implicated, e.g., a networked environment in which the client device serves merely as an interface to the network/bus, such as an object placed in an appliance, or other computing devices and objects as well. In essence, anywhere that data may be stored or from which data may be retrieved is a desirable, or suitable, environment for operation according to the invention.

Although not required, the invention can be implemented via an operating system, for use by a developer of services for a device or object, and/or included within application software that operates according to the invention. Software may be described in the general context of computer-executable instructions, such as program modules, being executed by one or more computers, such as client workstations, servers or other devices. Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that the invention may be practiced with other computer configurations. Other well known computing systems, environments, and/or configurations that may be suitable for use with the invention include, but are not limited to, personal computers (PCs), automated teller machines, server computers, hand-held or laptop devices, multi-processor systems, microprocessor-based systems, programmable consumer electronics, network PCs, appliances, lights, environmental control elements, minicomputers, mainframe computers and the like. The invention may also be practiced in distributed computing environments where tasks are performed by remote processing devices that are linked through a communications network/bus or other data transmission medium. In a distributed computing environment, program modules may be located in both local and remote computer storage media including memory storage devices, and client nodes may in turn behave as server nodes.

FIG. 1 thus illustrates an example of a suitable computing system environment 100 in which the invention may be implemented, although as made clear above, the computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

With reference to FIG. 1, an exemplary system for implementing the invention includes a general purpose computing device in the form of a computer system 110. Components of computer system 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer system 110 typically includes a variety of computer readable media. Computer readable media can be any available media that can be accessed by computer system 110 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, Random Access Memory (RAM), Read Only Memory (ROM), Electrically Erasable Programmable Read Only Memory (EEPROM), flash memory or other memory technology, Compact Disk Read Only Memory (CDROM), compact disc-rewritable (CDRW) digital versatile disks (DVD) or other optical disk storage, magnetic cassettes, magnetic tape, magnetic disk storage or other magnetic storage devices, or any other medium which can be used to store the desired information and which can accessed by computer system 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer system 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer system 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM, CDRW or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1 provide storage of computer readable instructions, data structures, program modules and other data for the computer system 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer system 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A monitor 191 or other type of display device is also connected to the system bus 121 via an interface, such as a video interface 190, which may in turn communicate with video memory (not shown). In addition to monitor 191, computer systems may also include other peripheral output devices such as speakers 197 and printer 196, which may be connected through an output peripheral interface 195.

The computer system 110 may operate in a networked or distributed environment using logical connections to one or more remote computers, such as a remote computer 180. The remote computer 180 may be a personal computer, a server, a router, a network PC, a peer device or other common network node, and typically includes many or all of the elements described above relative to the computer system 110, although only a memory storage device 181 has been illustrated in FIG. 1. The logical connections depicted in FIG. 1 include a local area network (LAN) 171 and a wide area network (WAN) 173, but may also include other networks/buses. Such networking environments are commonplace in homes, offices, enterprise-wide computer networks, intranets and the Internet.

When used in a LAN networking environment, the computer system 110 is connected to the LAN 171 through a network interface or adapter 170. When used in a WAN networking environment, the computer system 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer system 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Various distributed computing frameworks have been and are being developed in light of the convergence of personal computing and the Internet. Individuals and business users alike are provided with a seamlessly interoperable and Web-enabled interface for applications and computing devices, making computing activities increasingly Web browser or network-oriented.

For example, MICROSOFT®'s .NET platform includes servers, building-block services, such as Web-based data storage and downloadable device software. While exemplary embodiments herein are described in connection with software residing on a computing device, one or more portions of the invention may also be implemented via an operating system, application programming interface (API) or a "middle man" object between any of a coprocessor, a display device and a requesting object, such that operation according to the invention may be performed by, supported in or accessed via all of .NET's languages and services, and in other distributed computing frameworks as well.

Exemplary Embodiments

Figure 2:
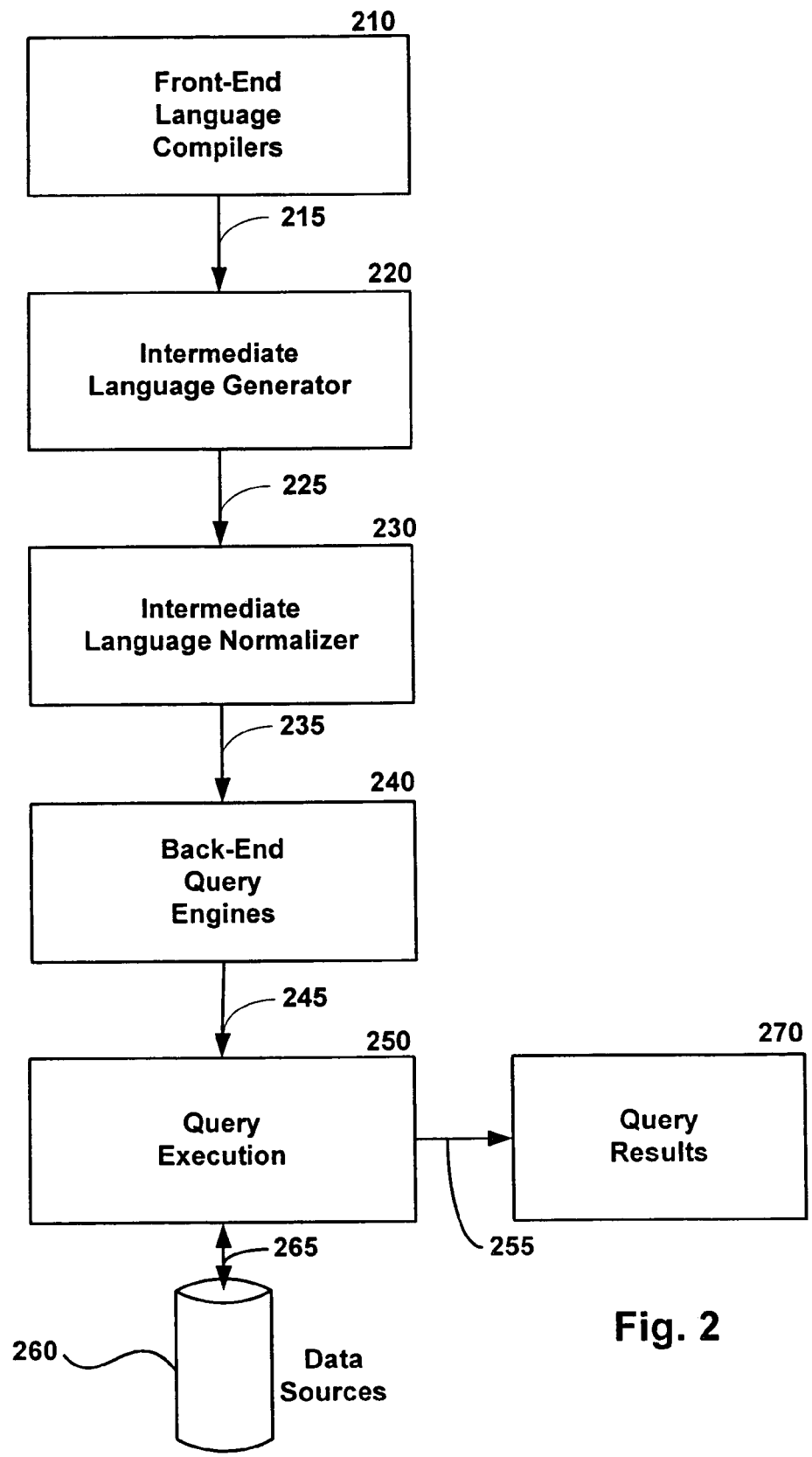
FIG. 2 is a block diagram depicting an exemplary functional architecture embodying exemplary aspects of the present invention.

FIG. 2 depicts a block diagram of a system architecture embodying the current invention. The architecture depicts the basic blocks needed to accept, compile, interpret, normalize and access data for effective XML queries upon multiple data sources. A plurality of front-end language compilers 210 may be realized which comport with XML or XML related standards. These front-end compilers 210 produce XML query, XML view, or other related XML language inquiries to produce compiled XML code 215.

An intermediate language generator 220 produces an intermediate language representation 225 of the input compiled XML code. The intermediate language representation may be normalized by a function 230 in the architecture 200 to provide utility across multiple data sources. The normalizer 230 may also be used to optimize the intermediate language so as to produce efficient intermediate language representation 235. It should be noted that an intermediate language normalizer is not strictly required for the architecture 200 of FIG. 2.

There may be a plurality of back-end query engines 240 to support the multiplicity of data sources 260 which may be accessed via the intermediate code representation. Each back-end engine may be constructed so that it efficiently works on data sources comporting with the model of the data within each supported data source. The back-end engine 240 generates the target data source query corresponding to the XML expression in the intermediate language. The back-end query engine 240 passes the appropriate machine code 245 to a query execution engine 250 which is capable of executing the given query. The query execution engine 250 normally accesses 265 one or more data sources 260 so that the engine may output 255 the query results 270.

One or more initial queries may be used over one or more different data sources of different types to produce the desired query results.

Figure 3:
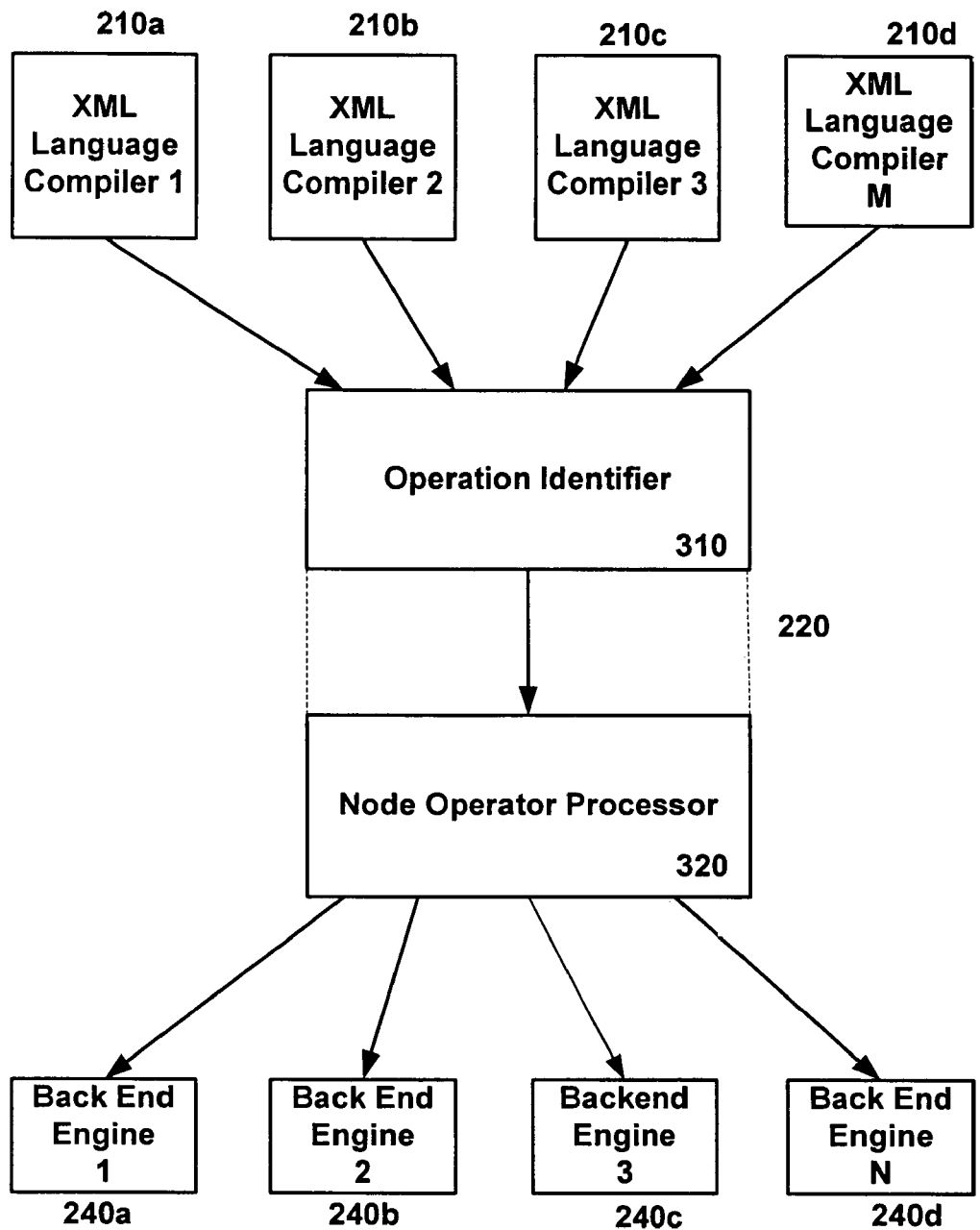
FIG. 3 is a block diagram depicting some exemplary elements of intermediate language generation in accordance with an embodiment of the present invention.

FIG. 3 is a functional block diagram of an exemplary intermediate language generator (e.g., element 220 in FIG. 2) in accordance with the present invention. FIG. 3 depicts that there may be multiple, up to M, XML language compiler sources 210a-d feeding the intermediate language (IL) generator 220. These XML language compilers generally involve scanning, parsing, semantic analysis, and conversion to some type of XML language. Typical examples of such languages are the W3C standards of XPath, XML Stylesheet Language (XSL), XSLT, XML Query Language (XQuery), as well as Microsoft® query languages such as XQuery DML™, OPath™ and WPath™. XML view compilers may also be present and include the W3C XML standard views of XQuery™ and Microsoft® Annotated Schemas, such as SQLXML™. The intermediate language representation technique of the present invention is compatible to other XML languages for queries and views as well. Generically, all of the XML compatible queries and views may be called XML language inquiries.

The intermediate language generator 220 depicted in FIG. 3 is divided into two major parts; one is an operation identifier 310 and the other is an node operator processor 320. Together they depict the semantic interpreter function of the XML intermediate language generator 220. The operation identifier 310 performs the task of identifying operations within the original XML query or view from the compilers 210-a-d. The identified operations are mapped to node points in a graph structure constructed by the operation identifier 310. The node operator processor 320 maps XML IL-specific operators into the constructed graph nodes to complete the graphical representation of the query. The node operator processor 320 then decodes the operators into an XML intermediate language representation of the original query or view. This output may then be passed onto one or more back-end engines 240a-d.

Up to N back-end engines 240-a-d may be added to the architecture in order to utilize the intermediate language representation to effect queries across multiple data sources. The intermediate language abstraction between query and view languages and multiple target models allows real XML data, such as from the Microsoft® .NET™ and virtual XML data to be used over both relational (e.g., SQL) and non-relational (e.g., flat-files) data.

Figure 4:
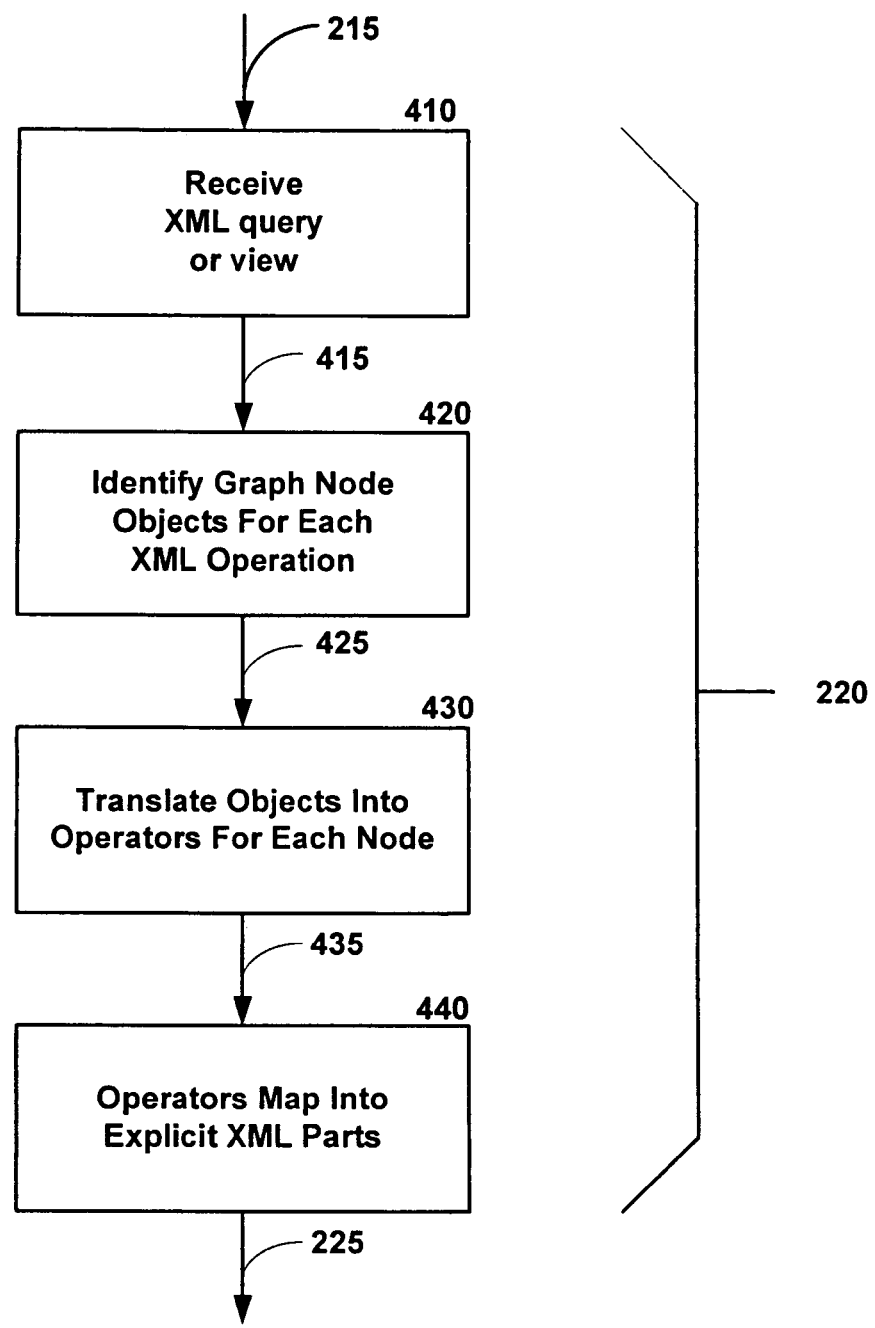
FIG. 4 is a flow diagram depicting an exemplary process of intermediate language generation in accordance with an embodiment of the present invention.

FIG. 4 represents a flow diagram of an embodiment of the current invention representing the semantic interpreter function of the exemplary intermediate language generator. An XML query or view is received at step 410 by the intermediate language generator. The received query is passed 415 to an identification function at step 420 which first identifies and generates graph node objects corresponding to each XML operation in the received XML query or view. Once the node objects are identified, they are passed to a translation function at step 430. The translation function assigns the identified objects into intermediate language operators. Typically, there is one intermediate language operator for each node. The translated node objects, now intermediate language operators, are now passed 435 to an intermediate language formation engine at step 440. This maps the intermediate language operators into explicit XML parts which form the constructed intermediate language 225. The constructed intermediate language may then be output to an intermediate language normalizer, as shown in FIG. 2 item 230 for example, or into one or more back-end engines as shown in FIG. 3 items 240a-d, for example.

Query Intermediate Language Attributes and Capabilities

The XML intermediate language is a representation of an XML query or view. As such, it may be termed a query intermediate language (QIL) because it is an explicit representation of the meaning of an XML query. The QIL may be viewed as a semantic representation common across XML query and view language compilers. QIL is similar to an ordinary abstract syntax tree (AST) but different in that QIL captures not the syntax but the semantics, or meaning, of a query. Another difference is that QIL is a graph structure and not a tree structure like AST.

QIL enables the abstraction of multiple different XML query languages and view definition languages (such as XPath, XSLT, XQuery, DML, and Annotated Schema, for example) over a variety of different target data sources (such as relational and non-relational data). As such, QIL enables a common construction to support all of the compatible XML languages. Every operation is both explicit and unambiguous, this makes QIL verbose, but decouples front-end compilers that assist in generating QIL from back-end engines that use QIL.

The query intermediate language also provides a way to model arbitrary data sources as virtual XML. Data sources may be exposed through the XML data model directly, or a QIL user may first analyze the intermediate language generated by the query and determine how best to distribute the query. For example, some query results may indicate that some operators may be readily pushed into the query engine suited for that data source and thus partition the query in a logical manner. QIL allows query tasks to be pushed into the engines that can most effectively perform the query tasks.

The query intermediate language utilizes its own operators with nodes of a graph structure which represents the original query. These operators allow new kinds of query optimizations, query re-writes, and other analysis not previously realizable with the corresponding data sources. Most QIL operators are common across multiple languages and some are specific to a particular XML query language. Although every XML language has its own implicit rules and special cases, the query intermediate language encodes these meanings explicitly and unambiguously.

The query intermediate language is a graph of node objects. This intermediate language consists of at most one rooted graph which is the main query, together with zero or more additional graphs that define XML intermediate language functions. There are many different ways to represent a graph in-memory; using a network of node objects is one embodiment. QIL utilizes classes that are shared across many different node types instead of defining one class for every node type.

The QIL is strongly-typed even if the original query language was not. QIL may support XML queries over XML data, XML queries over XML views of relational data, XSLT over relational data and XML queries over non-relational data such as text files, spreadsheets, and non-relational databases. The QIL may also be used to perform heterogeneous, distributed queries across multiple data sources and also may integrate XML and virtual XML data sources.

The QIL represents the meaning of a query and as such, is a logical query plan and not a physical query plan. There are a plurality of execution strategies for QIL. The language may be executed directly, iterating over the entire QIL graph in a left-depth-first fashion. Alternately, the query intermediate language may be translated to another language, such as SQL for execution. Yet another alternative is to make an analysis pass over the QIL, extract certain portions for execution by one engine, modify the graph as necessary, and leave the balance for execution by another existing engine.

QIL is strongly typed. QIL has a detailed type system and this type system is reflected in the tables which refer to the exemplary QIL operators some of which are described herein. Unless otherwise noted, the description indicates the static type of an expression, not the dynamic type of the value to which it evaluates.

Except for a few selected "operators" like DocumentOrder and DML, every QilNode expression is a sequence of some cardinality. This cardinality is always one of: None (unknown), Zero (empty), One (singleton), More (2+) or combinations of these unless otherwise indicated.

The sequences are made up of items, which may be either atomic values or nodes or both because heterogeneous sequences are allowed. Atomic values are further classified into a set of types such as Int32, String, and DateTime. For the most part, the QIL atomic types are a subset of the XQuery atomic types, and reflect practical implementation choices. An expression has atomic type None when it is not atomic (i.e., a node or a selected operator type like DML).

Exemplary QIL Operators

Preferably each operator of the QIL has a unique corresponding NodeType and a class that represents it. Essentially, operators are present in the nodes of a QIL graph structure. Consequently, operators assigned to nodes have node types and the operator becomes the function of the node type. There are many node types per class but only one class per node type. Each operator desirably has a single, explicit, unambiguous meaning. Generally, this meaning is independent of the types of its operands or the context in which it is used. Therefore, each operator may be considered context-free. Each operator is strongly typed according to the QIL type system described herein.

Provided herein are tables of some exemplary properties for each operator node type. Unless stated otherwise, no operand may be null. The QIL operators may be categorized into the following exemplary groups: special operators (error, nop, unknown), data sources, literals (scalar constants) Boolean operators, sequence operators, arithmetic operators, string operators, value comparison operators, node comparison operators, tuple spaces (including sorting), function definition and invocation, XML navigation, XML construction, XML property accessors, type operators, language-specific operators for XPath, XSLT, XQuery, and data manipulation language (DML).

Tuple Space Operator

An exemplary operator in QIL is the tuple. The tuple operator may be used frequently in QIL and may be used in a nested fashion. This operator is represented by the Tuple node type (class QIL Tuple), and desirably always has exactly three child nodes: a list of iterators that construct the tuple space, a where clause that filters the tuple space, and a return clause that produces the outcome of the tuple space.

One way to visualize nested tuples is to imagine a table of rows and columns, in which cells can themselves contain tables. A pair of six-sided dice provides an example. There are 36 possible combinations, as partially depicted below in Table 1.

TABLE 1

Tuple Space for 2 Six-Sided Dice

| Die 1 | Die 2 | Result |
|---|---|---|
| 1 | 1 | (1, 1) |
| 1 | 2 | (1, 2) |
| 1 | 3 | (1, 3) |
| 1 | 4 | (1, 4) |
| 1 | 5 | (1, 5) |
| 1 | 6 | (1, 6) |

TABLE 1-continued

Tuple Space for 2 Six-Sided Dice

| Die 1 | Die 2 | Result |
|---|---|---|
| 2 | 1 | (2, 1) |
| 2 | 2 | (2, 2) |
| . | . | . |
| . | . | . |
| . | . | . |

This tuple space has three columns. The first two correspond to the first and second dice respectively. The third column is used to hold the result; in this case, the pair of values. This tuple space has 36 rows, corresponding to the number of distinct combinations that result from rolling two dice. The following is the tuple space resulting from joining the set (1, 2, 3, 4, 5, 6) with itself, with, for example, the XQuery:

```
for $die1 in (1, 2, 3, 4, 5, 6),
    $die2 in (1, 2, 3, 4, 5, 6)
return ($die1, $die2)
```

This XQuery computes the cross-product of the two sets, and for each member in that cross-product, returns a sequence; the pair of die values. The result is an ordered list of lists:

((1, 1), (1, 2), (1, 3), (1, 4), (1, 5), (1, 6), (2, 1), (2, 2), . . . )

However, XQuery treats a list of lists as the concatenation of all of them, so this is really just the flattened list:

(1, 1, 1, 2, 1, 3, 1, 4, 1, 5, 1, 6, 2, 1, 2, 2, . . . )

Notice that the query could also be written as:

for $die1 in (1, 2, 3, 4, 5, 6)
for $die2 in (1, 2, 3, 4, 5, 6)
let $result:=($die1, $die2)
return $result In this form, each XQuery variable corresponds to exactly one column in the tuple space. This is also the concept for QIL. Each iterator in a QIL Tuple node or operator corresponds to one column in the tuple space. The return clause contributes an additional column, above written as a variable assignment using LET.

The result of executing the Tuple node is the ordered list of the results and when the results are themselves a list, they are concatenated together (flattened) as before. Like XQuery, QIL does not distinguish between lists and lists-of-lists.

The where clause provides an opportunity to filter the tuple space by eliminating some of its rows. The where clause desirably has no other effect on the tuple space. In all of the examples above, the where clause consists of a single true node, meaning that every row is accepted (no filtering takes place). However, the result could be limited to the six die rolls that sum to 7 as follows:

for $die1 in (1, 2, 3, 4, 5, 6)
for $die2 in (1, 2, 3, 4, 5, 6)
let $result:=($die1, $die2)
where $die1+$die2=7
return $result which creates the filtered tuple space depicted in Table 2.

TABLE 2

Tuple Space for Dice Rolls Summing to 7

| $die1 | $die2 | $result |
|---|---|---|
| 1 | 6 | (1, 6) |
| 2 | 5 | (2, 5) |
| 3 | 4 | (3, 4) |
| 4 | 3 | (4, 3) |
| 5 | 2 | (5, 2) |
| 6 | 1 | (6, 1) |

This XQuery example can be represented with the following query intermediate language representation:

Note: This is simply an XML representation of the QIL data structure.

```
<Tuple>
    <!- - First the iterator list - - >
    <For id = "$a">
        <List>
            <LiteralInteger>1</LiteralInteger>
            <LiteralInteger>2</LiteralInteger>
            <LiteralInteger>3</LiteralInteger>
            <LiteralInteger>4</LiteralInteger>
            <LiteralInteger>5</Literal Integer>
            <LiteralInteger>6</LiteralInteger>
        </List>
    </For>
    <For id = "$b">
        <List>
            <LiteralInteger>1</LiteralInteger>
            <LiteralInteger>2</LiteralInteger>
            <LiteralInteger>3</LiteralInteger>
            <LiteralInteger>4</LiteralInteger>
            <LiteralInteger>5</Literal Integer>
            <LiteralInteger>6</LiteralInteger>
        </List>
    </For>
    <Let id = "$c">
        <List>
            <For id = "$a"/>
            <For id = "$b"/>
        </List>
    </Let>
    <! - Then the where clause - - >
    <Eq>
        <Plus>
            <For id = "$a"/>
            <For id = "$b"/>
        </Plus>
        <LiteralInteger>7</LiteralInteger>
    </Eq>
    <! - Then the return clause - - >
    <Let id = "$c"/>
</Tuple>
```

The iterator nodes (For, Let) are introduced in the iterator list, and then referred to again later in the query. In order to refer to them symbolically, they may be given unique id attributes and then referred to later by these names. Note that these id strings do not really exist in the graph and have no relation to the original query; they are generated only when printing the graph as XML. Preferably, these references are memory pointers to the original node instances.

Consequently, this QIL graph contains twenty-two unique nodes and five references highlighted in bold (two in the definition of $c, two in the where clause of the Tuple, and one in the return clause of the Tuple).

As another example, consider this XQuery:

```
for $i in document ( 'foo.xml') /x/y
    return <z/>
```

This is equivalent to the XQuery

```
for $a in document ('foo.xml')
return
    for $b in $i/x
    return
        for $c in $j/y
        return <z/>
``` and both can be represented with the following QIL representation:

```
<Tuple>
    <For id = " $a " >
        <DataSource>
            <String > foo.xml </String>
        <DataSource>
    </For>
    <True/ >< ! - - no where clause - - >
    <Tuple>
        <For id = " $b "/>
        </Content>
            <For id = "$a"/>
        </Content>
    < / For >
    <Eq>
        <NameOf>
            <For id = "$b" / >
        </NameOf>
        <QName local – name = "x"/>
    </Eq>
    <Tuple>
        <For id = "$c">
            <Content>
                <For id = "$b">
            </Content>
        </For>
        <Eq>
            <NameOf>
                <For id = "$c" / >
            </NameOf>
            <QName local – name + "y"/ >
        </Eq>
        <ElementCtor>
            <QName local – name = "z"/>
            <List / >
        </ElementCtor>
    </Tuple>
</Tuple>
```

If the original document foo.xml consists of the following XML:

```
<x id = "x1" >
    <y id = "y1" / >
    <y id = "y2" / >
</x>
<x id = "x2">
    <y id = "y3"/>
    <y id = "y4"/>
    <y id = "y5"/>
</x>
``` then this QIL and XQuery example generate the nested tuple space depicted in Table 3.

TABLE 3

Tuple Space for a Simple XQuery

| $a | Result |||
|---|---|---|---|
| Document node | $b | Result ||
| | | $c | result |
| | x1 | y1 | <z/> |
| | | y2 | <z/> |
| | x2 | $c | result |
| | | y3 | <z/> |
| | | y4 | <z/> |
| | | y5 | <z/> |

Because the example data model does not include lists of lists, a column containing a table with N columns can be replaced by those N columns; expanding and copying rows as desired. Therefore, this tuple space is equivalent, through a series of unnest operations, to the "flattened" tuple space of Table 4.

TABLE 4

Flattened Tuple Space for a Simple XQuery

| $a | $b | $c | Result |
|---|---|---|---|
| document node | x1 | y1 | <z/> |
| document node | x1 | y2 | <z/> |
| document node | x2 | y3 | <z/> |
| document node | x2 | y4 | <z/> |
| document node | x2 | y5 | <z/> |

Executing the QIL produces five <z/> elements, iterating over the x/y in the expected document order.

A set of operators grouped as tuple space operators are described below with respect to Table 5. Tuple introduces a variable binding (assignment or iteration), filters it with a where clause, and returns a result expression. When the returned result is itself a Tuple, a cross-product or join results.

There are two kinds of iterator nodes; FOR and LET. LET is simply a variable assignment, and has cardinality 1. FOR iterates over a sequence, binding to each member in turn. The cardinality of FOR is therefore the length of its binding. The cardinality of a tuple space is at most the cardinality of its iterator times the cardinality of its return clause. For each item in the tuple space, the where clause is evaluated, and if true, the return clause is evaluated and returned. The result of the tuple is the sequence concatenation of all these return values (possibly the empty sequence). When introduced in a tuple, each iterator is in scope for all of the where clause and return clauses. The LET iterator preserves the node identity of its argument. Except for this complication, QIL is referentially transparent (meaning that LET can be replaced by its binding and vice-versa).

The POSITIONOF operator may be applied to an iterator. It determines the current position of the iterator within its binding. This position is a 1-based index. The POSITIONOF a LET iterator is always 1. The POSITIONOF a FOR iterator is between 1 and its length inclusive.

TABLE 5

Tuple Space Operators

| QIL Node Operator | Class | Semantics | QIL Types Cardinality | AtomicType |
|---|---|---|---|---|
| For | QilIterator | iteration | One | — |
| Let | QilIterator | assignment | the types of the Binding | the types of the Binding |
| Tuple | QilTuple | tuple space | Any | — |
| PositionOf | QilUnary | position of an iterator | One | Int32 |

Literal Operators

A set of operators grouped as literal operators is described below and in Table 6. Literals represent constants. A single class, QILLiteral, represents all literal types (except for the Booleans, which are represented using QILNode itself, and Name, which is represented using QILName). The literal value is stored as an object.

TABLE 6

Literal Operators

| QIL Node Operator | Class | Semantics | QIL Types Cardinality | Atomic Type |
|---|---|---|---|---|
| True | QilNode | Boolean constant (true) | One | Boolean |
| False | QilNode | Boolean constant (false) | One | Boolean |
| LiteralString | QilLiteral | String constant | One | String |
| LiteralInt32 | QilLiteral | 32-bit integer constant | One | Int32 |
| LiteralInt64 | QilLiteral | | One | Int64 |
| LiteralDouble | QilLiteral | Double constant | One | Double |
| LiteralFloat | QilLiteral | Float constant | One | Float |
| LiteralDecimal | QilLiteral | Decimal constant | One | Decimal |
| LiteralQName | QilName | Qualified name literal | One | QName |
| LiteralDuration | QilLiteral | Duration constant | One | Duration |
| LiteralYearMonthDuration | QilLiteral | yearMonth Duration constant | One | YearMonth Duration |
| LiteralDayTimeDuration | QilLiteral | dayTime Duration constant | One | DayTime Duration |
| LiteralDateTime | QilLiteral | DateTime constant | One | DateTime |
| LiteralDate | QilLiteral | Date constant | One | Date |
| LiteralTime | QilLiteral | Time constant | One | Time |
| LiteralOther | QilLiteral | Other-typed constant | One | Other |

Boolean Operators

A set of operators grouped as Boolean operators is described below and in Table 7. QIL desirably supports the traditional two-valued logic operators, AND, OR, and NOT, as well as CONDITIONAL (implication). Universal and existential quantification are preferably achieved through a combination of IsEmpty and Tuple.

QIL supports convenience operators for conjunctive normal form, disjunctive normal form, and a kind of switch. For AND and OR, both operands are desirably Boolean singletons. The operand of the NOT operator is desirably a Boolean singleton.

For the operator CONDITIONAL, the condition expression (the left property of the QILTernary node) is desirably a Boolean singleton, and the true/false branches (the center and right properties, respectively) can be any type. The else branch is not optional. However, one may usually use the empty list to achieve the effect a "dummy" branch. The type of the overall expression is the union of the true/false branch types.

To coerce operands to Boolean, one may use an operator such as XQUERYEBV or CONVERT, depending on the application's needs.

TABLE 7

Boolean Operators

| QIL Node Operator | Class | Semantics | QIL Types Cardinality | Atomic Type |
|---|---|---|---|---|
| And | QilBinary | Boolean And | One | Boolean |
| Or | QilBinary | Boolean or | One | Boolean |
| Not | QilUnary | Boolean not | One | Boolean |
| Conditional | QilTernary | if/then/else | union of the Center and Right types | |

Sequence Operators

A set of operators grouped as sequence operators is described below and in Table 8. Preferably every QIL expression is an ordered sequence of some cardinality. To work with sequences, XQuery defines a number of operators and aggregators. The LIST operator performs sequence concatenation on its members. An empty list has most types set to None; otherwise, the types of a list are the union of all the types of its members. LIST does not remove duplicate nodes by identity or duplicate values. To remove duplicates from a sequence, one, may explicitly apply one of the distinct operators (DISTINCT, DISTINCTBYVALUE), or else one may use a SET operator.

RANGE constructs the consecutive sequence of integers between the left bound and the right bound, similar to the XQuery TO operator. If the right bound is less than the left bound, then the sequence is decreasing. If they are equal, then the sequence has a single member (that value).

NTIMES is a binary operator whose left operand can be any type and right operand is desirably a non-negative integer singleton. It produces a sequence containing the left operand N times, where N is the value of the right operand. Notice that it does not copy the original. (NTIMES left right) is equivalent to the expression (Tuple (For (Range 1 Right)) (True) (Left)).

DISTINCT removes duplicate nodes (by identity) from a list. The order in which nodes are removed is preferably implementation-defined.

DISTINCTBYVALUE takes as its first argument a FOR iterator over a sequence, which is then in scope for the second argument for reference. The second argument specifies how to compute the values by which duplicates will be removed.

The UNION, INTERSECTION, and DIFFERENCE operators perform the corresponding set operators using node identity to remove duplicates. Their operands may be node sequences. The set difference is asymmetric; for a symmetric difference of two sequences A and B, one may take either the UNION of their pairwise differences; (Union (Difference A B) (Difference B A)), or equivalently, the DIFFERENCE of their UNION with their INTERSECTION; (Difference (Union A B) (Intersection A B)).

The numerical aggregation functions (AVERAGE, SUM, MINIMUM, MAXIMUM) have operands that are desirably sequences of numeric values. They promote all members of the sequence to a common type, and then compute the appropriate function. For example, (Average (Decimal 1.0) (Int32 3)) is (Decimal 2.0). All four operators applied to the empty sequence results in the empty sequence.

For most of these operators, the type of the overall expression depends on its arguments. For example, the union of a sequence of elements with a sequence of attributes has as its NodeKind the union of the two kinds. All of the group sequence operators accept operands of any cardinality.

TABLE 8

Sequence Operators

| QIL Node Operator | Class | Semantics | QIL Types Cardinality | AtomicType |
|---|---|---|---|---|
| Length | QilUnary | sequence length | One | Int32 |
| List | QilList | sequence concate- nation | — | — |
| Range | QilBinary | integer sequence construction | — | Int32 |
| NTimes | QilBinary | sequence construction | — | — |
| Distinct | QilUnary | duplicate removal (by node identity) | Any | — |
| DistinctByValue | QilBinary | duplicate removal (by value) | Any | — |
| Intersection | QilBinary | set intersection (by node identity) | Any | None |
| Difference | QilBinary | set difference (by node identity) | Any | None |
| Union | QilBinary | set union (by node identity) | Any | None |
| Average | QilUnary | arithmetic average | — | — |
| Sum | QilUnary | arithmetic sum | — | — |
| Min | QilUnary | arithmetic minimum | — | — |
| Max | QilUnary | arithmetic maximum | — | — |

Arithmetic Operators

A set of operators grouped as arithmetic operators are described below and in Table 9. Arithmetic operators have behavior that varies depending on the types of their operands. All arithmetic operators require that their operands have the same (numeric) types and cardinality one, and then perform arithmetic in that type. Division is the one exception to these rules. DIVIDE always promotes integer operands to double. INTEGERDIVIDE performs integer division, and accordingly its operands are integers.

Arithmetic exceptions such as overflow and underflow are implementation-defined. For the floating-point types, NaN is non-signaling and infinities and negative zero are allowed.

The arithmetic operators are not defined for non-numeric types or non-singletons. To operate on strings, one may use the string operators (like STRCONCAT) or convert them to numeric types.

To perform arithmetic on sequences of numbers, one may use TUPLE to iterate through the sequence and perform member-wise operations, or else consider using some of the sequence aggregators such as SUM.

TABLE 9

Arithmetic Operators.

| QIL Node Operator | Class | Semantics | QIL Types Cardinalty | Atomic Type |
|---|---|---|---|---|
| Negate | QilUnary | arithmetic negation | One | — |
| Plus | QilBinary | Addition | One | — |
| Minus | QilBinary | Subtraction | One | — |
| Multiply | QilBinary | multiplication | One | — |
| Divide | QilBinary | Division | One | — |
| Modulo | QilBinary | Modulus | One | — |
| IntegerDivide | QilBinary | integer division | One | — |

String Operators

A set of operators grouped as string operators is described below and in Table 10. The string operators provide common string functionality such as concatenation and substring matching.

STRLENGTH computes the length of a string. Its argument is desirably a singleton string. STRCONCAT is a variable-argument operator like LIST. It concatenates its arguments into a single string. Each argument may be a list of strings or the empty list. It takes the empty list to the empty string. STRCONCAT accepts an optional string property, Delimiter, which defaults to the empty string. It inserts the delimiter value between every pair of string members. Note that STRCONCAT(( ), ( )) is still the empty string, while STRCONCAT(" ", " ") results in the delimiter.

The STRSUBSTRING node operator computes the substring of a string. The first argument must be a singleton string and the second and third arguments desirably are singleton integers. It takes the maximum of 0 or the second argument (called i0), and the maximum of 0 or the third argument (called i1), and computes the substring consisting of the characters between i0 and i0+i1 inclusive.

STRCONTAINS takes two singleton strings as arguments, and returns true if the first string contains the second; false otherwise. Every string contains the empty string. STRENDSWITH and STRBEGINSWITH have the same functionality, but constrain the match to appear at the end or beginning of the string, respectively.

TABLE 10

String Operators

| QIL Node Operator | Class | Semantics | QIL Types Cardinality | AtomicType |
|---|---|---|---|---|
| StrLength | QilUnary | String length | One | Int32 |
| StrConcat | QilStrConcat | String concatenation | One | String |
| StrSubstring | QilTernary | Substring | One | String |
| StrContains | QilBinary | string containment | One | Boolean |
| StrBeginsWith | QilBinary | string begins with a substring | One | Boolean |
| StrEndsWith | QilBinary | string ends with a substring | One | Boolean |

Value Comparison Operators

A set of operators grouped as value comparison operators are described below and in Table 11. QIL defines several operators for comparing values. These correspond to the value comparison operators of XQuery with the same names (EQ, NE, LT, LE, GT, and GE). Node comparison operators are described hereinbelow.

Each operand is desirably a singleton, and both operands desirably have the same type. One may use TREAT, CONVERT, or other type operators to promote or convert operands as necessary.

String comparisons should normally take into account collations. Sequences can be compared in many different ways existential, universal, first, member-wise, etc.

TABLE 11

Value Comparison Operators

| QIL Node Operator | Class | Semantics | QIL Types Cardinality | AtomicType |
|---|---|---|---|---|
| Ne | QilBinary | not equal | One | Boolean |
| Eq | QilBinary | equal | One | String |
| Gt | QilBinary | greater than | One | Boolean |
| Lt | QilBinary | less than | One | Boolean |
| Ge | QilBinary | greater than or equal to | One | Boolean |
| Le | QilBinary | less than or equal to | One | Boolean |

Node Comparison Operators

A set of operators grouped as node comparison operators in described below and in Table 12. QIL defines several operators for comparing nodes by identity or document order. These correspond to the node comparison operators of XQuery (IS, ISNOT, BEFORE (<<), and AFTER (>>)).

BEFORE (AFTER) returns true if the left operand appears before (after) the right in document order. For nodes from different documents (or not in documents at all), the ordering is defined and stable within the execution of a query, but otherwise implementation-defined.

Each operand is desirably a singleton node. The node type IS returns true if the two operands are the same node (by identity); false otherwise. ISNOT returns the opposite. From the definition of BEFORE/AFTER, it follows that two nodes have the same identity if and only if both BEFORE and AFTER return false for them. Consequently, (IsNot $x $y) is equivalent to (Or (Before $x $y) (After $x $y)). Sequences may be compared in many different ways existential, universal, first, member-wise, etc.

TABLE 12

Node Comparison Operators

| QIL Node Operator | Class | Semantics | QIL Types Cardinality | AtomicType |
|---|---|---|---|---|
| Is | QilBinary | same identity | One | Boolean |
| IsNot | QilBinary | different identity | One | String |
| Before | QilBinary | appears before | One | Boolean |
| After | QilBinary | appears after | One | Boolean |

Sorting and Collation Operators

A set of operators grouped as, sorting and collation operators is described below and in Table 13. QIL defines a single SORT node or operator, which takes two arguments. The first argument introduces a FOR iterator over the collection to be sorted. This iterator is in scope for the second argument, which expresses a sort key.

Each sort key is either ASCENDING or DESCENDING. The key expression can be a constant like DOCUMENTORDER or a more complex expression.

DOCORDERDISTINCT is a convenience operator that sorts a sequence by document order and removed duplicate nodes by identity. (DocOrderDistinct $x) is equivalent to (Distinct (Sort X (Ascending DocOrder))). Its operand must be a node sequence possibly empty.

TABLE 13

Sorting and Collation Operators

| QIL Node Operator | Class | Semantics | QIL Types Cardinality | Atomic Type |
|---|---|---|---|---|
| Sort | QilBinary | Sort | — | — |
| Ascending | QilNode | ascending sort key | None | None |
| Descending | QilNode | descending sort key | None | None |
| DocumentOrder | QilNode | sort key representing document | None | None |
| DocOrderDistinct | QilUnary | sort by document order and remove duplicates | — | None |

Function Definition and Invocation Operators

A set of operators grouped as function definition and invocation operators is described below and in Table 14. QIL can represent both function definitions and invocations. Invocations come in several styles; invocation of functions that are themselves defined using QIL, invocation of built-in to the runtime functions and both early-bound an late-bound invocation of arbitrary methods (e.g., XSLT extension objects).

Arguments are preferably positional. If one needs to tunnel call-by-name semantics through QIL, then one may either need to map all names to positions (as the XSLT compiler does) or else construct a structure that pairs names with values (as ms:variables( ) may do well for SQLXML stored procs) and encode the name matching algorithm in QIL.

Invocations pass arguments using an array of LET iterators. In the FUNCTION definition these iterators are bound to null acting as symbolic references whose values are externally supplied at runtime.

TABLE 14

Function Definition and Invocation Operators

| QIL Node Operator | Class | Semantics | QIL Types Cardinality | AtomicType |
|---|---|---|---|---|
| Function | QilFunction | function definition | — | — |
| Invoke | QilInvoke | invoke a QIL function | — | — |
| Invoke Early Bound | QilDelegate | invoke a CLR method using MethodInfo (early-bound) | — | — |
| Invoke Late Bound | QilDelegate | invoke a CLR method by name/signature (late-bound) | — | — |
| Invoke Builtin | QILInvoke Builtin | invoke a built-in function | — | — |

XML Navigation Operators

A set of operators grouped as XML Navigation operators is described below and in Table 15. Path-style navigation is not preserved syntactically in QIL; it unravels into tuple spaces and navigation operators.

Generally speaking, navigation in QIL is done using the CONTENT node operator. This operator desirably selects all the content within a node (e.g., all the attribute, namespace, text, processing-instruction, comment, and element nodes inside an element). The content sequence can then be filtered to selectively keep only certain node kinds (e.g., using TUPLE and ISTYPE).

The ATTRIBUTE operator is supplied for convenience in pattern recognition; it selects an attribute node by name (the right operand), matching 0 or 1 attribute nodes. Other navigation nodes are provided for common directions in the graph; these are mostly taken from XPath and have the same meaning. Every operator is applied one node at a time; to apply to an entire sequence of nodes, one may use a TUPLE to iterate over the node sequence. The one exception is DEREF, whose argument must be a single ID value. It computes the result of id( ) lookup.

TABLE 15

XML Navigation Operators

| QIL Node Operator | Class | Semantics | QIL Types Cardinality | Atomic Type |
|---|---|---|---|---|
| Content | QilUnary | select node content | Any | None |
| Attribute | QilBinary | select an attribute by name. | ZeroOrOne | None |

TABLE 15-continued

XML Navigation Operators

| QIL Node Operator | Class | Semantics | QIL Types Cardinality | Atomic Type |
|---|---|---|---|---|
| Parent | QilUnary | parent::node( ) | ZeroOrOne | None |
| Self | QilUnary | self::node( ) | One | None |
| Root | QilUnary | select the root | ZeroOrOne | None |
| XmlContext | QilNode | current( ) | — | — |
| DescendantOrSelf | QilUnary | descendant::node( ) | Any | None |
| Deref | QilUnary | id( ) | ZeroOrOne | None |

XML Construction Operators

A set of operators grouped as sorting and collation operators is described below and in Table 16. QIL defines operators to construct every XML node kind. These constructors all follow the usual XML data model constraints. For example, no node can contain a document node, and consecutive text nodes are merged.

Every constructed node preferably gets a unique identity. This identity is defined for QIL like it is for XQuery: It is preserved across operations like LET, and should be respected by operators with side-effects, especially DML.

Every constructed node gets an ordering relative to every other node. This is termed "document order", even though it applies to nodes not in documents, and nodes from different documents. This ordering is defined for QIL exactly like it is for XQuery.

ELEMENTCTOR Operator

ELEMENTCTOR is implemented using the class QilBinary. The left operand is the name, the right operand is the content. It may be an error if any node in the content is a document node. All the nodes in the content are implicitly copied.

ATTRIBUTE and NAMESPACE nodes may not be constructed after other non-attribute/namespace content in an element. Behavior in such situations is implementation-defined If the element name is in a namespace and the namespace is not in scope, then an implementation may emit a synthesized namespace declaration and/or prefix. Implementations are not required to honor the prefix value of the name; it is merely a serialization hint.

ATTRIBUTECTOR Operator

ATTRIBUTECTOR is implemented using QilBinary class. The left operand is the name, the right operand is the content. The right operand may be coerced into the desired expression using an operator such as XQUERYATTRIBUTECONTENT. If the attribute name is in a namespace and the namespace is not in scope, then an implementation may emit a synthesized namespace declaration and/or prefix. Implementations are not required to honor the prefix value of the name; it is merely a serialization hint. To construct a typed attribute, one may mark it with the XML Schema type information or apply a type operator such as XQUERYVALIDATE.

TEXTCTOR and CDATACTOR Operators

TEXTCTOR is implemented using QilUnary class. The child operand is the text content, and must be a string-typed singleton. CDATACTOR is a TEXTCTOR indicating an optional serialization hint (i.e. to use a CDATA section). Implementations may ignore this hint.

COMMENTCTOR Operator

COMMENTCTOR is implemented using QilUnary class. The CLASS operand is the text content, and must be a string-typed singleton.

PICTOR Operator

PICTOR is implemented using QilBinary class. The left operand is the target NCNAME, and may be null. Otherwise, it must be a QName-typed singleton. The right operand is the remaining content, and must be a string-typed singleton.

NAMESPACEDECL Operator

NamespaceDecl is implemented using QilBinary class. It constructs a namespace declaration. The left operand is the prefix and desirably is a QName-typed singleton. The right operand is the namespace, and desirably is a string-typed singleton. If the left operand is the empty string, then the NAMESPACECTOR corresponds to a default namespace declaration.

If conflicting namespace declarations occur (e.g., two NAMESPACECTORS for the same prefix in an element's content, or a NAMESPACECTOR that conflicts with a prefixed name already emitted), then the behavior is implementation-defined.

RTFCTOR Operator

RTFCTOR is implemented using Qilunary class, and its child is desirably a node sequence or the empty sequence. It constructs a result-tree-fragment (from XSLT). Effectively, RTFCTOR is a barrier to navigation, preventing composition from taking place. In many respects, it behaves more like an atomic value than like a node.

TABLE 16

XML Construction Operators

| QIL Node Operator | Class | Semantics | QIL Types | |
|---|---|---|---|---|
| | | | Cardinality | Atomic Type |
| ElementCtor | QilBinary | construct an element | One | None |
| AttributeCtor | QilBinary | construct an attribute | One | None |
| CommentCtor | QilUnary | construct a comment | One | None |
| PICtor | QilBinary | construct a processing-instruction | One | None |
| TextCtor | QilUnary | construct a text node | One | None |
| CdataCtor | QilUnary | construct a text node | One | None |
| DocumentCtor | QilUnary | construct a document node | One | None |
| NamespaceDecl | QilBinary | construct a namespace declaration | One | None |
| RtfCtor | QilUnary | construct a result-tree fragment | One | None |

Node Property Operators

A set of operators grouped as node property operators is described below and in Table 17. QIL supports operators for accessing certain node properties, such as name.

The NAMEOF operator computes the QName of a node. If the node has no name, then it returns the empty sequence. The LOCALNAMEOF, NAMESPACEOF, and PREFIXOF operators compute the corresponding parts of the node's name. If the node has no name or is missing one of these parts, then they return the empty string. All of these operators require their operand to be a singleton node.

TABLE 17

Node Property Operators

| QIL Node Operator | Class | Semantics | QIL Types | |
|---|---|---|---|---|
| | | | Cardinality | AtomicType |
| NameOf | QilUnary | compute the QName of a node | ZeroOrOne | QName |
| LocalNameOf | QilUnary | compute the local-name of a node | One | String |
| NamespaceOf | QilUnary | compute the namespace of a node | One | String |
| PrefixOf | QilUnary | compute the prefix of a node | One | String |

Copy and Projection Operators

A set of operators grouped as copy and projection operators is described below and in Table 18. QIL supports several kinds of copy and projection operators. Copy is an operation that desirably has no effect on atomic values. The effect on nodes produces substantially an exact replica of the original but with a new node identity. Projection "preserves" node identity, but selectively prunes a node to keep only some of its content.

DEEPCOPY constructs a copy of the entire subgraph headed by a node. SHALLOWCOPY is the same as DEEPCOPY for all node kinds other than element and document nodes, for document it copies the document node but none of its content, for element it copies the element node (i.e. its name) but none of its content (i.e. no attributes).

PROJECTINCLUDE and PROJECTEXCLUDE are both binary operators. The left operand must be a FOR iterator over a sequence of nodes. The right operand must be a Boolean singleton possibly referring to that iterator. Both operators perform projection by recursively iterating over the forest described by the left operand and including or excluding, respectively all nodes and all of their ancestors for which the right operand evaluates to true.

TABLE 18

Copy and Projection Operators

| QIL Node Operator | Class | Semantics | QIL Types | |
|---|---|---|---|---|
| | | | Cardinality | AtomicType |
| DeepCopy | QilUnary | deep copy | — | None |
| ShallowCopy | QilUnary | dhallow copy | — | None |
| ProjectInclude | QilBinary | inclusionary projection | Any | None |
| ProjectExclude | QilBinary | exclusionary projection | Any | None |

Type Operators

A set of operators grouped as type operators is described below and in Table 19. QIL defines many operators for working with the QIL type system dynamically.

TABLE 19

Type Operators

| QIL Node Operator | Class | Semantics | QIL Types Cardinality | Atomic Type |
|---|---|---|---|---|
| Atomize | QilUnary | perform atomization | ZeroOrMore | — |
| TreatAs | QilUnary Type | treat as type | — | — |
| CanTreatAs | QilUnary Type | whether treat succeeds | One | Boolean |
| Convert | QilUnary Type | convert to type | — | — |
| IsConvertible QilUnaryType | QilUnary Type | whether convert succeeds | One | Boolean |
| IsType | QilUnary Type | whether type matches | One | Boolean |
| IsEmpty | QilUnary | true if argument is empty (cardinality 0) | One | Boolean |

ATOMIZE Operator

ATOMIZE effectively retrieves the typed value of an XML node, by performing the XQuery atomization rules described in the XQuery standard. Specifically, ATOMIZE takes a sequence of any cardinality, and returns a new sequence consisting of the atomic values of the members of the original sequence which for atomic values is a no-op; for nodes it is like a call to the typed-value accessor. For example, (XQueryAtomize (List (1 "b" 3)) results in the list unchanged, while (XQueryAtomize (List $x $y)) in which $x is a node with typed value (1, 2) and $y is a node with typed value ("3", 4), would result in the combined sequence: (1, 2, "3", 4).

TREATAS Operator

Because QIL is strongly and, statically typed, it may occur that a stronger, or weaker type is desired than an expression has statically. For example, a double might be desired where an expression is an integer. For such cases (e.g., upcasting or downcasting), TREATAS can be used to coerce the expression into the desired type or cardinality.

TREATAS takes an argument and a type. It attempts to treat the argument as having that type. The dynamic effect is to either do nothing. (i.e., the value remains unchanged), or else error. The static effect is to change the static type of the expression. Unlike Convert or XQueryValidate, it is not possible to move across the type hierarchy and no parsing is performed. For example, it is an error to attempt to treat a string as an integer, or to treat a decimal as a double.

All properties of the target type are used. When a property of the target type equals that of the argument type, then no work is done. When the properties differ, then the effect is as follows. If the argument cardinality is compatible with the target cardinality, then the value is returned unchanged. Otherwise, an error may occur. Table 20 describes cardinality compatibility. The (exact, dynamic) cardinality of the argument is on the left, the (static) target cardinality on the top. "OK" means the TREAT-AS succeeds, "err" means it fails.

TABLE 20

Cardinality Compatibility

| Sequence Length | Target Cardinality | | | | | | |
|---|---|---|---|---|---|---|---|
| | Zero | One | More | ZeroOrOne | NotOne | OneOrMore | Any |
| 0 | ok | err | err | ok | ok | err | ok |
| 1 | err | ok | err | ok | err | ok | ok |
| 2+ | err | err | ok | err | ok | ok | ok |

If the argument item kind is compatible with the target item kind, then the value is returned unchanged. Otherwise, an error is thrown. Table 21 describes item kind compatibility:

TABLE 21

Item Kind Compatibility

| Arg. kind | Target Kind | | | | |
|---|---|---|---|---|---|
| | None | AV | Node | Both | Dml |
| None | ok | ok | ok | ok | err |
| AV | err | ok | err | ok | err |
| Node | err | err | ok | ok | err |
| Both | err | err | err | ok | err |
| Dml | err | err | err | err | ok |

If the argument atomic type is compatible with the target atomic type, then the value is returned unchanged. Otherwise, an error may occur. This compatibility is determined by subtype substitutability rules in which the two types are compatible if and only if one inherits from the other by restriction, and not by list/union. If the target type is not strict, then one may look at the XML type information to determine whether the argument type is a subtype of the static one. Otherwise, this may be determined from the QIL atomic type. If the argument node kind bit-wise ORed with the target node kind is zero, then an error may occur. Otherwise, the node kinds are compatible.

Finally, if the target type is not strict, then strictness is not checked. If the target type is strict and the argument type is not, then the argument dynamically should have the strict target type or else an error may occur.

CANTREATAS Operator

CANTREATAS returns true if TREATAS would succeed, otherwise false (if TREATAS would error). This operator exists mainly for symmetry with CONVERT/ISCONVERTIBLE.

CONVERT Operator

CONVERT applies a data type conversion from a value of one type, to a value of another type. For example, (Convert (String "1") Int32) results in the integer 1. CONVERT is different from TREATAS, which can only cast to a type which the value already has or is promotable to have.

The specific type conversions applied will match those used by XQuery.

ISCONVERTIBLE Operator

ISCONVERTIBLE returns true if CONVERT would succeed, otherwise false (if CONVERT would error). It is generally as expensive as performing the CONVERT, but allows for conditional branching instead of terminating the computation with an error. This operator exists mainly to support the XQuery CASTABLE operator.

ISTYPE Operator

ISTYPE returns true if a value has the indicated type. It is useful for implementing type switches and equivalent. For each aspect of QilType, there is a wildcard value (e.g., QilCardinality.Any, QilAtomicType.Any, etc.) that always matches every value. So, for example, to test if an expression is an element of any type, one may use a QilType whose XmlNodeKind is QilXmlNodeKind.Element and all other values are wildcards. To test whether an expression has a given cardinality, one may use a QilType whose cardinality is that value, and all other aspects of the type are wildcards.

ISEMPTY Operator

Similar to ISTYPE (using QilCardinality.Zero), this operator returns true if a sequence is empty, false otherwise.

XQuery Operators

A set of operators grouped as XQuery operators is described below and in Table 22. Certain languages have additional operators that cannot be expressed using other QIL operators, or else are so common that they deserve their own node types.

TABLE 22

XQuery Operators

| | | | QIL Types | |
|---|---|---|---|---|
| QIL Node Operator | Class | Semantics | Cardinality | Atomic Type |
| XQueryEbv | QilUnary | Effective Boolean value | One | Boolean |
| XQueryElement Content | QilUnary | See below | Any | — |
| XQueryAttribute Content | QilUnary | See below | One | String |
| XQueryValidate | QilUnaryType | See below | — | — |

XQUERYEBV Operator

This unary operator takes a sequence of values and converts it to a Boolean value according to the rules described in the XQuery specification.

Specifically, it returns false if the operand is the empty sequence, the Boolean value false, the empty string, zero (any numeric type), or NaN (double or float). Otherwise, it returns true.

XQUERYELEMENTCONTENT Operator

XQUERYELEMENTCONTENT takes a sequence as its argument, and returns a sequence of nodes. Each node in the original sequence is preserved; each sequence of adjacent atomic values is converted into a text node containing the atomic values concatenated with separating spaces.

XQUERYATTRIBUTECONTENT Operator

XQUERYELEMENTCONTENT takes a sequence as its argument, and returns a string value. Each node in the original sequence is replaced by its string value; each atomic value is also converted to string. Then the resulting sequence of atomic values is concatenated them with separating spaces.

XQUERYVALIDATE Operator

The XQUERYVALIDATE operator validates a sequence of nodes, resulting in either validation error or else a new sequence of type-annotated nodes. It has the same meaning as the XQuery VALIDATE operator.

XPath Operators

A set of operators grouped as XPath operators is described below and in Table X23. XPath has a small number of operators required to represent additional navigation axes and some type conversions. Some of these could be expressed using existing QIL operators, but are common enough to merit their own representation.

XPATHNODEVALUE, XPATHNUMBERTOSTRING, and XPATHSTRINGTONUMBER implement XPath type conversion rules. All three are unary operators. The operand to XPATHNODEVALUE must be a singleton node. The operand XPATHNUMBERTOSTRING must be a singleton numeric type. The operand to XPATHSTRINGTONUMBER must be a singleton string.

The other operators perform navigation. All are unary operators whose operand must be a singleton node, and they result in the expected sequence of nodes reached by that navigation operation.

TABLE 23

XPath Operators

| | | | QIL Types | |
|---|---|---|---|---|
| QIL Node Operator | Class | Semantics | Cardinality | Atomic Type |
| XPathNodeValue | QilUnary | convert a node to string according to XPath 1.0 rules | One | String |
| XPathNumber ToString | | convert a number to string according to XPath 1.0 rules | One | String |
| XPathStringTo Number | QilUnary | convert a string to number according to XPath 1.0 rules | One | Double |
| XPathAncester | QilUnary | ancestor::node( ) | Any | None |
| XPathAncestor OrSelf | QilUnary | ancestor-or-self::node( ) | Any | None |
| XPathDescendant | QilUnary | descendant::node( ) | Any | None |
| XPathFollowing | QilUnary | following::node( ) | Any | None |
| XPathFollowing Sibling | QilUnary | following-sibling::node( ) | Any | None |
| XPathNamespace | QilUnary | namespsce::node( ) | Any | None |
| XPathPreceding | QilUnary | preceding::node( ) | Any | None |
| XPathPreceding Sibling | QilUnary | preceding-sibling::node( ) | Any | None |

DML Operators

A set of operators grouped as DML operators is described below and in Table 24. QIL can represent data-changing operations such as insert, delete, and update.

The XQuery DML grammar alters the conditional production of the XQuery grammar to allow DML statements as either branch. This requires no change to the QIL representation for conditionals; the compiler will place the DML expressions as the true/false branches of the conditional node. The XQuery DML grammar also alters FLWR expressions to allow DML statements to appear in place of the usual return clause. The QIL representation (Tuple) of the FLWR expression is the return member of the TUPLE node. The XQuery DML grammar adds four new operators, INSERT, UPDATE, DELETE, and REPLACE. The QIL operators listed in Table 24 represent these, with the same semantics as defined by the XQuery DML specification.

Because DML operations have no return value, they have no corresponding QILDataType. A value, QilItemKind.Dml, represents DML expression types to facilitate static type checking in the compiler and optimizer. To test whether a QIL expression may perform DML, one needs to look at the MemberKind of the top-most node.

TABLE 24

DML Operators

| QIL Node Operator | Class | Semantics | QIL Types Cardinality | AtomicType |
|---|---|---|---|---|
| DmlInsertAfter | QilBinary | see XQuery DML spec | None | None |
| DmlInsertBefore | QilBinary | see XQuery DML spec | None | None |
| DmlInsertInto | QilBinary | see XQuery DML spec | None | None |
| DmlInsertIntoFirst | QilBinary | see XQuery DML spec | None | None |
| DmlInsertIntoLast | QilBinary | see XQuery DML spec | None | None |
| DmlDelete | QilUnary | see XQuery DML spec | None | None |
| DmlUpdate | QilTernary | see XQuery DML spec | None | None |
| DmlReplace | QilBinary | see XQuery DML spec | None | None |

Special Operators

A set of operators grouped as special operators is described below and in Table 25. The NOP node type exists primarily to support constructing QIL on-demand or to facilitate a top-down construction of QIL. For example, a developer may place the NOP node into a graph, and fix-up its content later as the construction develops. Note that node types must still be set appropriately.

The UNKNOWN node type exists primarily to support partially constructed QIL during compile-time and to allow applications to "re-use" QIL for their own purposes. Basically, UNKNOWN is an opaque node type with no defined semantics, and may be represented using any class at all.

The ERROR node type takes two arguments. The first must be a string sequence, and describes a message to the user. The second must be a Boolean singleton, and when true indicates that the error is fatal (re: terminate execution). When false, execution may continue beyond the message.

No restrictions are placed on the types or cardinalities of the operands.

TABLE 25

Special Operators

| QIL Node Operator | Class | Semantics | QIL Types Cardinality | AtomicType |
|---|---|---|---|---|
| Unknown | — | n/a | — | — |
| Nop | QILUnary | No-op (delegate to its child) | — | — |
| Error | QILBinary | Dynamic error or message | None | None |

External Data Source Operator

An operator termed as external data source is described below and in Table 26. The primary source of external data is the DATASOURCE node type, implemented with the QIL-DATASOURCE class. This operator has a string tag value, which describes the kind of data source it is (e.g. like a namespace), and an arbitrary User Data object which is not interpreted by QIL, but may have meaning for some back-end processor.

The data source may be a path name to a directory or file or may be a universal resource locator address. For this data source type, the User Data object is an QIL node expression that evaluates to a string. The string value identifies a location to pass to a function for loading an XML document (e.g. exactly like a call to the document( ) function). The XML document need not be actual XML; the document may be an abstraction of XML such as a type of virtual XML.

TABLE 26

External Data Source Operator

| QIL Node Operator | Class | Semantics | QIL Types Cardinality | AtomicType |
|---|---|---|---|---|
| DataSource | QILDataSource | Arbitrary (possibly virtual XML document or fragment | Any | None |

CONCLUSION

As mentioned above, while exemplary embodiments of the present invention have been described in connection with various computing devices and network architectures, the underlying concepts may be applied to any computing device or system in which it is desirable to implement an intermediate language representation for XML. Thus, the methods and systems of the present invention may be applied to a variety of applications and devices. While exemplary programming languages, names and examples are chosen herein as representative of various choices, these languages, names and examples are not intended to be limiting. One of ordinary skill in the art will appreciate that there are numerous ways of providing object code that achieves the same, similar or equivalent systems and methods achieved by the invention.

The various techniques described herein may be implemented in connection with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device will generally include a processor, a storage medium readable by the processor (including volatile and non-volatile memory and/or storage elements), at least one input device, and at least one output device. One or more programs that may utilize the signal processing services of the present invention, e.g., through the use of a data processing API or the like, are preferably implemented in a high level procedural or object oriented programming language to communicate with a computer. However, the program(s) can be implemented in assembly or machine language, if desired. In any case, the language may be a compiled or interpreted language, and combined with hardware implementations.

The methods and apparatus of the present invention may also be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, a video recorder or the like, or a receiving machine having the signal processing capabilities as described in exemplary embodiments above becomes an apparatus for practicing the invention. When implemented on a general-purpose processor, the program code combines with the processor to provide a unique apparatus that operates to invoke the functionality of the present invention. Additionally, any storage techniques used in connection with the present invention may invariably be a combination of hardware and software.

While the present invention has been described in connection with the preferred embodiments of the various figures, it is to be understood that other similar embodiments may be used or modifications and additions may be made to the described embodiment for performing the same function of the present invention without deviating therefrom. Furthermore, it should be emphasized that a variety of computer platforms, including handheld device operating systems and other application specific operating systems are contemplated, especially as the number of wireless networked devices continues to proliferate. Therefore, the present invention should not be limited to any single embodiment, but rather should be construed in breadth and scope in accordance with the appended claims.

What is claimed:

1. A method for semantic representation of one or more XML language inquiries across relational and non-relational data sources, the method comprising:
   receiving at least one XML language inquiry;
   defining a plurality of nodes of a rooted graph structure which represents the at least one XML language inquiry, the rooted graph structure having at least one node object for every operation within the at least one XML language inquiry;
   translating each of the at least one node objects using intermediate language operators represented by a unique corresponding node type and class, wherein there are multiple node types per class and one class per node type;
   generating a semantic intermediate language representation having the rooted graph structure, wherein the semantic intermediate language representation explicitly describes a meaning of the one or more XML language inquiries, the semantic intermediate language representation including a tuple operator having three child nodes, the child nodes comprising a list of iterators that construct tuple space, a clause that filters the tuple space, and a clause that produces an outcome of the tuple space, wherein each iterator in the semantic intermediate language representation of a tuple node corresponds to one column in the tuple space, and wherein the semantic intermediate language representation decouples front-end language compilers from back-end query engines that use the semantic intermediate language representation, such that, when used in a compiler system having M front-front end languages and N back-end search engines, has a complexity of M plus N compiler implementations; and
   effecting a partitioning of the at least one XML language inquiry by distributing one or more portions of the semantic intermediate language representation to corresponding query engines based upon a data source.

2. The method of claim 1, wherein the non-relational data sources comprise one or more of a text document, a spreadsheet, and a non-relational database.

3. The method of claim 1, wherein the generating step further comprises breaking down high level operations of the received inquiry into explicit parts.

4. The method of claim 3, wherein the explicit parts are common across multiple XML languages.

5. The method of claim 1, wherein the operators comprise one or more of special operators, data sources, literals, Boolean operators, sequence operators, arithmetic operators, string operators, value comparison operators, node comparison operators, tuple spaces, function definition and invocation, XML navigation, XML construction, XML property accessors, type operators, language specific operators, and data manipulation operators.

6. The method of claim 1, wherein the at least one XML language inquiry comprises one or more of an XML query language and an XML view definition language.

7. The method of claim 1, wherein the at least one XML language inquiry comprises one or more of an XPath, an XSLT, an XQuery, a DML, an OPath, and an Annotated Schema inquiry.

8. The method of claim 1, wherein the semantic intermediate language representation allows XML queries over XML views of relational data.

9. A semantics interpreter for expressing a meaning of one or more of an XML query and an XML view across multiple data sources, the interpreter comprising:
   an input for receiving the one or more of an XML query and an XML view which form an inquiry;
   a graph structure generator for defining node objects for every operation within the inquiry, wherein the inquiry is represented as a rooted graph;
   a translator for assigning intermediate language operators for each node object, wherein the intermediate language operators break down operations of the inquiry into explicit parts, wherein each of the intermediate language operators is represented by a unique corresponding node type and class, and wherein there are multiple node types per class and one class per node type;
   an output for providing the explicit parts as an intermediate language representation for expressing the meaning of the one or more of the XML query and the XML view, the intermediate language representation including a tuple operator having three child nodes, the child nodes comprising a list of iterators that construct tuple space, a clause that filters the tuple space, and a clause that produces an outcome of the tuple space, wherein each iterator in the intermediate language representation of a tuple node corresponds to one column in the tuple space, and wherein the intermediate language representation decouples front-end language compilers from back-end query engines that use the intermediate language representation, such that utilization of the intermediate language representation in the semantics interpreter, when used in a compiler system having M front-front end languages and N back-end search engines, has a complexity of M plus N compiler implementations; and
   multiple query engines, each query engine corresponding to one or more portions of the intermediate language representation based upon a data source, wherein partitioning of the inquiry is effected by distributing at least one portion of the representation to the corresponding query engine.

10. The semantic interpreter of claim 9, wherein the multiple data sources comprise relational and non-relational data sources.

11. The semantic interpreter of claim 10, wherein the non-relational data sources comprise one or more of a text document, a spreadsheet, and a non-relational database.

12. The semantic interpreter of claim 9, wherein the operators comprise one or more of special operators, data sources, literals, Boolean operators, sequence operators, arithmetic operators, string operators, value comparison operators, node comparison operators, tuple spaces, function definition and invocation, XML navigation, XML construction, XML property accessors, type operators, language specific operators, and data manipulation.

13. The semantic interpreter of claim 9, wherein the explicit parts are common across multiple XML languages.

14. A computer-readable storage medium having computer-executable instructions for performing a method of intermediate language representation of a received inquiry, the computer-executable instructions comprising instructions for:
  receiving one or more of an XML query and an XML view forming the received inquiry;
  defining a plurality of node objects in a rooted graph structure which represents the at least one received inquiry, the graph structure having a node object for every operation within the received inquiry;
  translating each node using intermediate language operators which break down operations of the received inquiry into explicit parts, wherein each of the intermediate language operators is represented by a unique corresponding node type and class, and wherein there are multiple node types per class and one class per node type;
  generating instructions corresponding to the explicit parts forming an intermediate language representation for subsequent queries over one or more of relational and non-relational data sources, wherein the intermediate language representation comprises an explicit description of a meaning of the received inquiry, and wherein the intermediate language representation decouples front-end language compilers from back-end query engines that use the intermediate language representation, such that utilization of the intermediate language representation, when used in a compiler system having M front-front end languages and N back-end search engines, has a complexity of M plus N compiler implementations; and
  effecting a partitioning of the inquiry by distributing one or more portions of the representation to corresponding query engines based upon the one or more data sources.

15. The computer-readable storage medium of claim 14, wherein the operators comprise one or more of special operators, data sources, literals, Boolean operators, sequence operators, arithmetic operators, string operators, value comparison operators, node comparison operators, tuple spaces, function definition and invocation, XML navigation, XML construction, XML property accessors, type operators, language specific operators, and data manipulation.

16. The computer-readable storage medium of claim 14, wherein the explicit parts are common across multiple XML languages.

17. The computer-readable storage medium of claim 14, wherein the received inquiry comprises one or more of an XML query language and an XML view definition language.

18. A computer system for generating a semantic representation of an inquiry, the computer system comprising:
  a processor for executing computer instructions; and
  at least one module comprising:
    an input function for receiving one or more of an XML query and an XML view which forms the inquiry;
    a graph structure generator for generating a rooted graph representing the inquiry and defining node objects for every operation within the inquiry;
    a translator function for assigning intermediate language operators for each node object wherein the operators break down operations of the inquiry into explicit parts, wherein each of the intermediate language operators is represented by a unique corresponding node type and class, wherein there are multiple node types per class and one class per node type;
    an output for providing the explicit parts as an intermediate language representation for expressing a meaning of the XML query and the XML view, wherein the intermediate language representation decouples front-end language compilers from back-end query engines that use the intermediate language representation, such that utilization of the intermediate language representation, when used in a compiler system having M front-front end languages and N back-end search engines, has a complexity of M plus N compiler implementations, wherein the at least one module comprises one or more software modules and one or more hardware modules, wherein the intermediate language representation includes a tuple operator having three child nodes, the child nodes comprising a list of iterators that construct tuple space, a clause that filters the tuple space, and a clause that produces an outcome of the tuple space, and wherein each iterator in the intermediate language representation of a tuple node corresponds to one column in the tuple space; and
  effecting a partitioning of the inquiry by distributing one or more portions of the intermediate language representation to corresponding query engines based upon a data source.

19. The computer system of claim 18, wherein the operators comprise one or more of special operators, data sources, literals, Boolean operators, sequence operators, arithmetic operators, string operators, value comparison operators, node comparison operators, tuple spaces, function definition and invocation, XML navigation, XML construction, XML property accessors, type operators, language specific operators, and data manipulation.

20. The computer system of claim 18, wherein the explicit parts are common across multiple XML languages.

* * * * *